(12) United States Patent
Park et al.

(10) Patent No.: US 9,411,377 B2
(45) Date of Patent: Aug. 9, 2016

(54) FLEXIBLE DISPLAY DEVICE

(71) Applicant: SAMSUNG DISPLAY CO., LTD., Yongin, Gyeonggi-Do (KR)

(72) Inventors: Sang-Il Park, Yongin-si (KR); Jeoung Sub Lee, Seoul (KR); Min-Hoon Choi, Seoul (KR); In Sun Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 184 days.

(21) Appl. No.: 14/332,339

(22) Filed: Jul. 15, 2014

(65) Prior Publication Data

US 2015/0212547 A1 Jul. 30, 2015

(30) Foreign Application Priority Data

Jan. 28, 2014 (KR) ........................ 10-2014-0010795

(51) Int. Cl.
*G02F 1/1333* (2006.01)
*G06F 1/16* (2006.01)

(52) U.S. Cl.
CPC .......... *G06F 1/1652* (2013.01); *G02F 1/13338* (2013.01); *G06F 1/1643* (2013.01); *G06F 2203/04102* (2013.01)

(58) Field of Classification Search
CPC .................................................. G02F 1/13338
See application file for complete search history.

(56) References Cited

U.S. PATENT DOCUMENTS 9,213,929 B2 * 12/2015 Tazaki ................ G06K 19/037
2010/0026662 A1 2/2010 Oohira 2010/0201603 A1 8/2010 Kee et al.
2012/0138970 A1 6/2012 Shim et al.

(Continued)

FOREIGN PATENT DOCUMENTS

KR 10-2006-0114443 A 11/2006
KR 10-2007-0003295 A 1/2007

(Continued)

OTHER PUBLICATIONS

Hastrich, C., et al., "Bouncing Ideas, emerging design ideas of biomimicry, critical creativity, sustainability and strategic thinking, Self Healing Materials," Filed under: Materials Research, Posted: Feb. 1, 2012, http://bouncingideas.wordpress.com/2012/02/01/self-healing-materials/, 8 pages.

(Continued)

*Primary Examiner* — Timothy L Rude
(74) *Attorney, Agent, or Firm* — Lewis Roca Rothgerber Christie LLP (57) ABSTRACT

A flexible display device includes a flexible display panel, a touch sensing layer on the flexible display panel, and a window on the touch sensing layer. The window may include an elastic portion and a plurality of rigid portions at a surface of the elastic portion and separated from each other. The elastic portion may be made of a soft material having elastic characteristics, and the rigid portion may be made of a hard material. The rigid portion may have a checkered pattern or a striped pattern at the surface of the elastic portion. The flexible display device may also include a barrier film at a surface of the flexible display panel. The barrier film may protect the flexible display panel and the touch sensing layer from external impacts.

12 Claims, 6 Drawing Sheets

(56) References Cited

U.S. PATENT DOCUMENTS

| | | |
|---|---|---|
| 2012/0147599 A1 | 6/2012 | Shim et al. |
| 2012/0192466 A1 | 8/2012 | Kee et al. |
| 2013/0177748 A1 | 7/2013 | Hirai et al. |
| 2014/0198266 A1* | 7/2014 | Park .................. G02F 1/13338 349/12 |
| 2014/0253826 A1* | 9/2014 | He ....................... G06F 1/1643 349/12 |
| 2015/0062456 A1* | 3/2015 | Miyazaki ............... G06F 3/044 349/12 |

FOREIGN PATENT DOCUMENTS

| | | |
|---|---|---|
| KR | 10-2011-0128533 A | 11/2011 |
| KR | 10-2012-0063748 A | 6/2012 |
| KR | 10-2013-0015230 A | 2/2013 |
| KR | 10-2013-0022649 A | 3/2013 |

OTHER PUBLICATIONS

Toohey, K.S., "Self-healing materials with microvascular networks," Nature Materials, Jun. 10, 2007, pp. 1-5.

* cited by examiner

FLEXIBLE DISPLAY DEVICE

CROSS-REFERENCE TO RELATED APPLICATION

This application claims priority to and the benefit of Korean Patent Application No. 10-2014-0010795 filed in the Korean Intellectual Property Office on Jan. 28, 2014, the entire contents of which are incorporated herein by reference.

BACKGROUND

1. Field

Aspects of the present invention relate to a flexible display device.

2. Description of the Related Art

In the field of display devices capable of displaying an image, recently, attention has been drawn to a flexible display device capable of being bent.

These flexible display devices include a window protecting the display device from external impact, though the window may also be flexible such that it can be bent. To provide flexibility to the window, the window in these flexible display devices is made of a soft material, which may make it difficult for the window to perform the function of protecting the display device from external impact.

The above information disclosed in this Background section is only for enhancement of understanding of the background of the invention and therefore it may contain information that does not form the prior art that is already known in this country to a person of ordinary skill in the art.

SUMMARY

Aspects of the present invention relate to a flexible display device. More specifically, aspects of the present invention are directed to a flexible display device including a flexible window configured to protect the display device from external impact.

A flexible display device according to an embodiment of the present invention includes a flexible display panel, a touch sensing layer on the flexible display panel, and a window on the touch sensing layer. The window may include an elastic portion and a plurality of rigid portions at a surface of the elastic portion and separated from each other.

Each rigid portion may have a thickness ranging from approximately 5% to approximately 50% of a thickness of the window.

The elastic portion may be made of a soft material having elastic characteristics.

The soft material of the elastic portion may be made of one selected from an olefin-based elastomer, a urethane-based elastomer, and a polyester-based elastomer.

The rigid portion may be made of a hard material.

The hard material of the rigid portion may be made of one selected from borides, carbides, aluminum nitride, silicon nitride, boron nitride, aluminum oxide, zirconium oxide, titanium oxide, and beryllium oxide.

A sum of a width of one rigid portion and an interval between rigid portions may be less than a maximum width of a portion of the flexible display device in contact with a touch pen configured to operate the flexible display device.

The flexible display device may further include a plurality of pixels, wherein the sum of the width of one rigid portion and an interval between the rigid portions may be greater than or equal to a width of one pixel.

The rigid portion may have a checkered pattern at the surface of the elastic portion.

The rigid portion may have a striped patter at the surface of the elastic portion.

The flexible display panel may include a flexible substrate made of one selected from polyethylene naphthalate (PEN), polycarbonate (PC), polyarylate (PAR), polyetherimide (PEI), polyethersulfone (PES), and polyimide (PI).

The flexible display device according to an embodiment of the present invention may further include a barrier film at a surface of the flexible display panel. The barrier film may protect the flexible display panel and the touch sensing layer from external impacts.

As described above, according to an embodiment of the present invention, the window elastic portion may be made of the soft material having elastic characteristics, and window rigid portion may be at the surface of the elastic portion and may be made of the hard material, thereby resulting in flexibility and sheet resistance against an external force.

DETAILED DESCRIPTION OF THE EMBODIMENTS

Embodiments of the present invention will be described in detail with reference to the attached drawings. The embodiments of the present invention may be modified in many different forms, and should not be construed as being limited to the embodiments set forth herein. Rather, the embodiments of the present invention are provided for thoroughness and completeness of this disclosure, and will fully convey the concepts and aspects of the present invention to those skilled in the art.

In the drawings, the thickness of layers and regions may be exaggerated for clarity. In addition, when a layer is described to be on or formed on another layer or on a substrate, this means that the layer may be on or formed on the other layer or on the substrate, or a third layer may be interposed between the layer and the other layer or the substrate. Like numbers refer to like elements throughout the specification.

Figure 1:
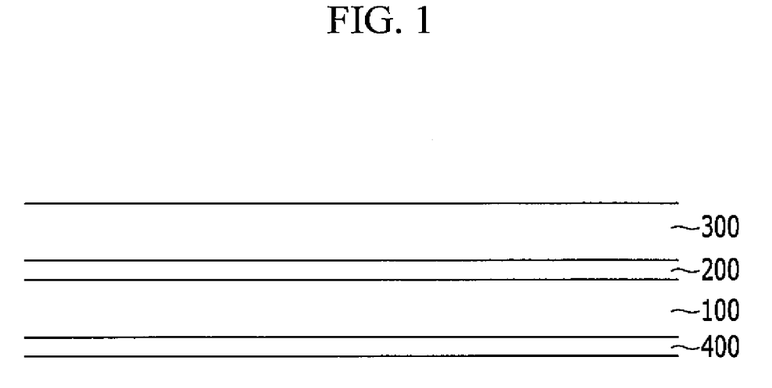
FIG. 1 is a schematic cross-sectional view of a flexible display device according to an embodiment of the present invention.
Figure 2:
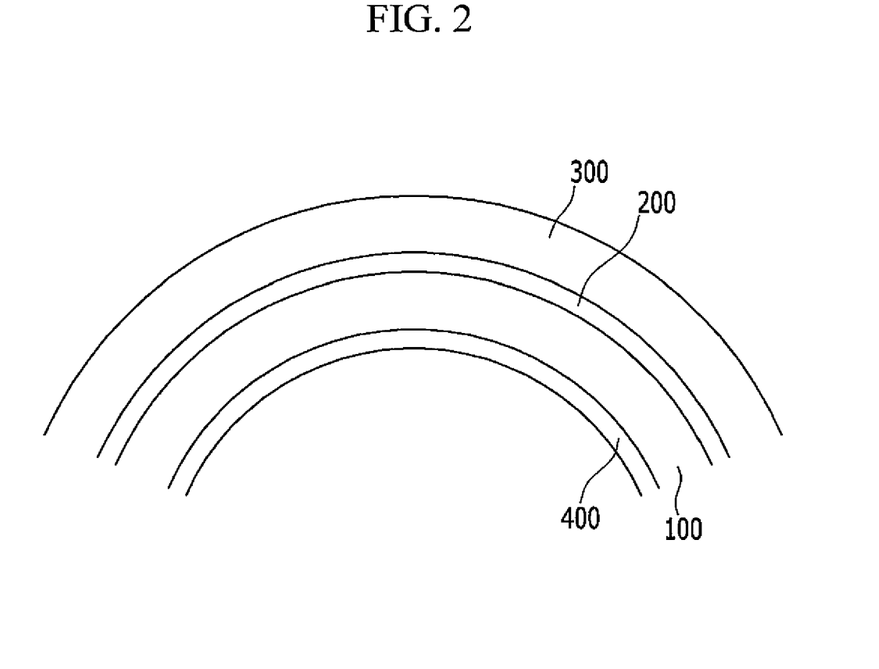
FIG. 2 is a schematic cross-sectional view of a bent flexible display device according to an embodiment of the present invention.

FIG. 1 is a schematic cross-sectional view of a flexible display device according to an embodiment of the present invention. FIG. 2 is a schematic cross-sectional view of a bent flexible display device according to an embodiment of the present invention.

Referring to the embodiments disclosed in FIGS. 1 and 2, a flexible display device according to the present exemplary embodiment includes a flexible display panel 100 where an image may be displayed, a touch sensing layer 200, a window 300, and a barrier film 400.

The flexible display panel 100, according to an embodiment, includes a plurality of pixels displaying an image processed in the flexible display device. For example, in an embodiment in which the flexible display device is a mobile terminal such as a mobile phone, the flexible display panel 100 may display an image such as a user interface (UI) related to a communication or a graphical user interface (GUI).

The flexible display panel 100, according to an embodiment, includes a flexible substrate. In an embodiment, the flexible substrate may be made of a plastic material having excellent thermal resistance and excellent durability, for example, the flexible substrate may be made of polyethylene naphthalate (PEN), polycarbonate (PC), polyarylate (PAR), polyetherimide (PEI), polyethersulfone (PES), and/or polyimide (PI). However, the material of the flexible substrate of the flexible display panel 100 is not limited thereto, and the flexible display panel 100 may be a flexible substrate made of a variety of materials having flexibility suitable for use with a flexible display device.

In an embodiment, the flexible display panel 100 may include a flexible substrate having a plurality of thin film transistors, a plurality of gate lines, a plurality of data lines, and a plurality of pixel electrodes; a flexible substrate having a plurality of color filters and a common electrode; and a liquid crystal layer positioned between the two substrates.

In an embodiment, the flexible display panel 100 may include a plurality of thin film transistors, a plurality of gate lines, a plurality of data lines, and a plurality of organic light emitting diodes on the flexible substrate.

The touch sensing layer 200, according to an embodiment, is on the flexible display panel 100 and is configured to sense a touch. The touch sensing layer 200, according to this embodiment, may sense a touch if an object approaches the touch sensing layer 200 or if an object actually comes into contact with the touch sensing layer 200. More specifically, according to an embodiment, the touch sensing layer 200 is configured to sense indirect contact in which an external object, for example, a finger or hand of a user, approaches or hovers over the touch sensing layer 200 without making physical contact with the touch sensing layer 200, or to sense direct or actual physical contact in which the external object, for example, the finger or hand of the user directly contacts the touch sensing layer 200.

In an embodiment, for example as shown in FIG. 1, the touch sensing layer 200 is on the flexible display panel 100, however the location of the touch sensing layer 200 is not limited thereto, and, according to an embodiment, the touch sensing layer 200 may be within, part of, or integral with the flexible display panel 100. Further, the touch sensing layer 200, according to an embodiment, may be positioned on the flexible substrate to be attached to the flexible display panel 100.

The window 300, according to an embodiment, is on the touch sensing layer 200, and functions to protect the flexible display panel 100 and the touch sensing layer 200 from an external force and/or an external contaminant on the flexible display device.

In an embodiment, a polarization layer and a resin layer may be included between the window 300 and the touch sensing layer 200. The polarization layer, according to an embodiment, may reduce a reflection of external light to increase a contrast ratio of the flexible display device, and the resin layer, according to an embodiment, may be an adhesive layer for attaching the window 300 to the flexible display device.

The barrier film 400, according to an embodiment, is at a rear surface of the flexible display panel 100. The barrier film 400, according to this embodiment, may absorb an external impact such that the flexible display panel 100 and the touch sensing layer 200 may be prevented from being damaged by the external impact. In an embodiment, the barrier film 400 may be made of a material including air pockets or openings, for example, a cushion or a sponge material, for absorbing the impact. In an embodiment, the barrier film 400 may also couple the flexible display panel 100 to other parts of the flexible display device, for example, a case. At this time, the barrier film 400 may include an adhesive layer to be coupled to the other parts.

According to an embodiment, the flexible display panel 100, the touch sensing layer 200, the window 300, and the barrier film 400 are flexible, as shown in the embodiment illustrated in FIG. 2. The window 300, according to an embodiment, may be flexible enough to have bending characteristics, but also may have sheet resistance characteristics to protect the flexible display panel 100 and the touch sensing layer 200 against external impacts or forces.

Next, the window 300 according to an embodiment of the present invention will be described with reference to FIGS. 3 and 4.

Figure 3:
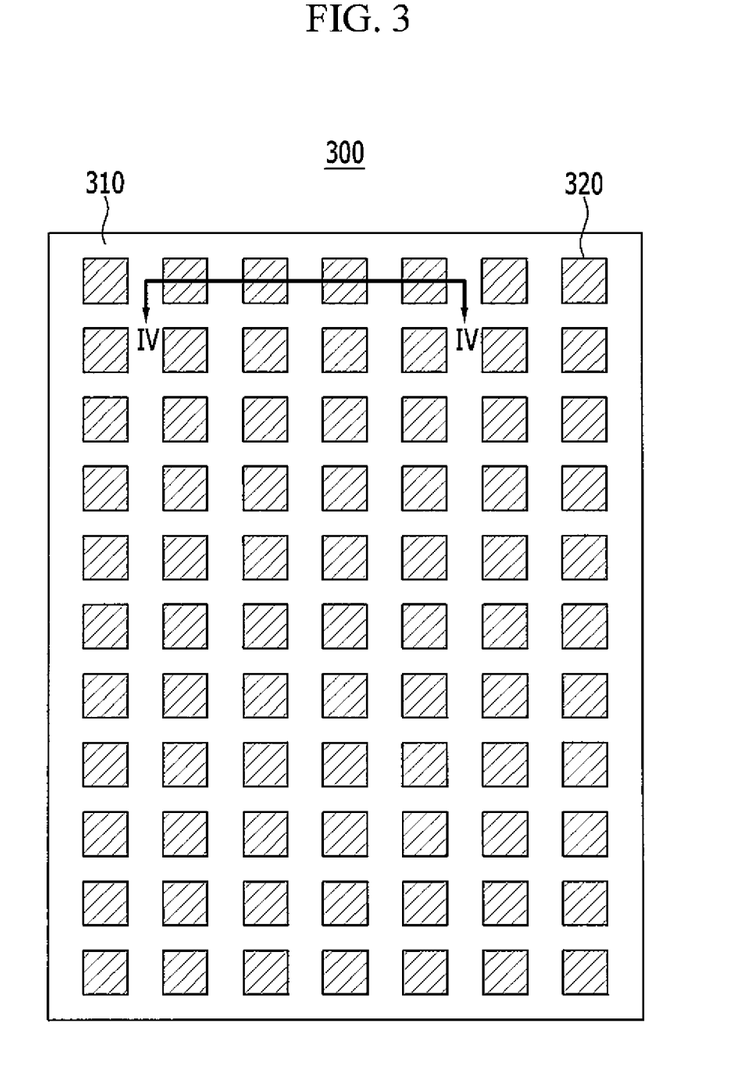
FIG. 3 is a schematic view of a plane surface of a window of a flexible display device according to an embodiment of the present invention.

FIG. 3 is a schematic view of a plane surface of a window of a flexible display device according to an embodiment of the present invention. FIG. 4 is a cross-sectional view taken along the line IV-IV of FIG. 3 showing a portion of the window of the flexible display device configured to receive an external touch.

Figure 4:
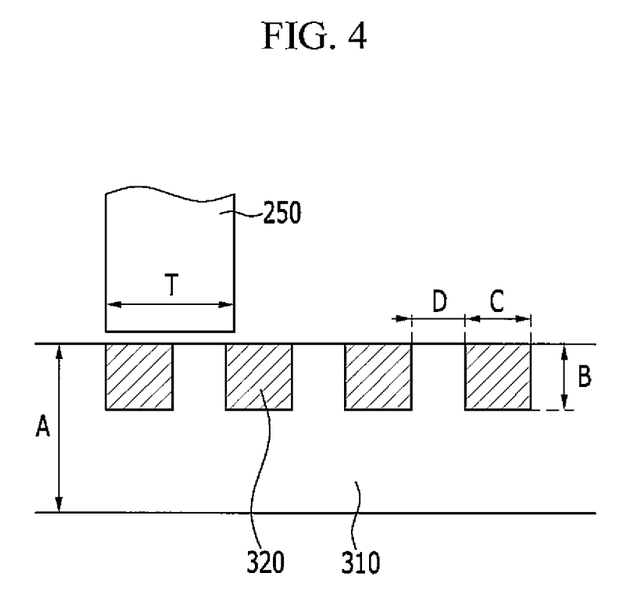
FIG. 4 is a cross-sectional view taken along the line IV-IV of FIG. 3 showing a portion of the window of the flexible display device configured to receive an external touch.

Referring to FIGS. 3 and 4, the window 300 according to this embodiment includes an elastic portion 310 and a plurality of rigid portions 320 at a surface of the elastic portion 310 and separated from each other. The rigid portions 320, in an embodiment, have a quadrangle shape and may be positioned in a checkered pattern at the surface of the elastic portion 310.

The elastic portion 310, according to an embodiment, is made of a soft material having elastic characteristics. For example, the elastic portion 310, according to an embodiment, may be made of a material selected from an olefin-based elastomer, a urethane-based elastomer, and a polyester-based elastomer. In an embodiment, for example as illustrated in FIG. 3, the window 300 may include an elastic portion 310 made of a soft material, thereby having flexibility.

The rigid portions 320, according to an embodiment, are made of a hard material. For example, the rigid portions 320, according to an embodiment, may be made of a material selected from borides, carbides, aluminum nitride, silicon nitride, boron nitride, aluminum oxide, zirconium oxide, titanium oxide, and beryllium oxide. In an embodiment, for example as shown in FIG. 3, the window 300 may include a plurality of rigid portions 320 made of a hard material, thereby providing sheet resistance characteristics against external forces.

In an embodiment, the rigid portions 320 may each have a thickness B extending into an inner portion of the elastic portion 310. In this embodiment, the thickness B of each rigid portion 320 may range from approximately 5% to approximately 50% of a thickness A of the window 300. In an embodiment where the thickness B of each rigid portion 320 is less than 5% of the thickness A of the window 300, it may be difficult for the window 300 to provide the necessary sheet resistance against external forces. In an embodiment where the thickness B of each rigid portion 320 exceeds 50% of the thickness A of the window 300, it may be difficult for the window 300 to have flexibility.

As described above, the window 300, according to an embodiment, includes the elastic portion 310 made of a soft material and the rigid portions 320 at the surface of the elastic portion 310 and made of a hard material, thereby providing flexibility as well as sheet resistance against external forces.

In an embodiment, a sum of a width C of one rigid portion 320 and an interval D between the rigid portions 320 is less than a maximum width T of a touched portion of the flexible display device generated by the touch of a user or a touch pen 250. Thus, according to this embodiment, when the display device is touched by the user or a touch pen 250, the elastic portion 310 and a rigid portion 320 are simultaneously touched. Accordingly, in this embodiment, a restoration effect is generated by the elastic portion 310 made of the material having elastic characteristics after the touch of the user or the touch pen 250, such that the window 300 may exhibit mechanical flexibility at the location where the touch of the user or the touch pen 250 occurred. In an embodiment, the touch may be generated through the finger or hand of the user, as well as the touch pen 250, and in these embodiments, the sum of the width C of one rigid portion 320 and the interval D between the rigid portions 320 may be less than the maximum width T of the touched portion.

In an embodiment, the sum of the width C of one rigid portion 320 and the interval D between the rigid portions 320 may be greater than or equal to a width of one pixel of the flexible display panel 100. Accordingly, the window 300 including the elastic portion 310 and the rigid portions 320, in this embodiment, may be prevented from affecting the resolution of the flexible display device. In this embodiment, one pixel may refer to one red pixel, one green pixel, and one blue pixel.

Next, a window 500 according to another embodiment of the present invention will be described with reference to FIGS. 5 and 6.

Figure 5:
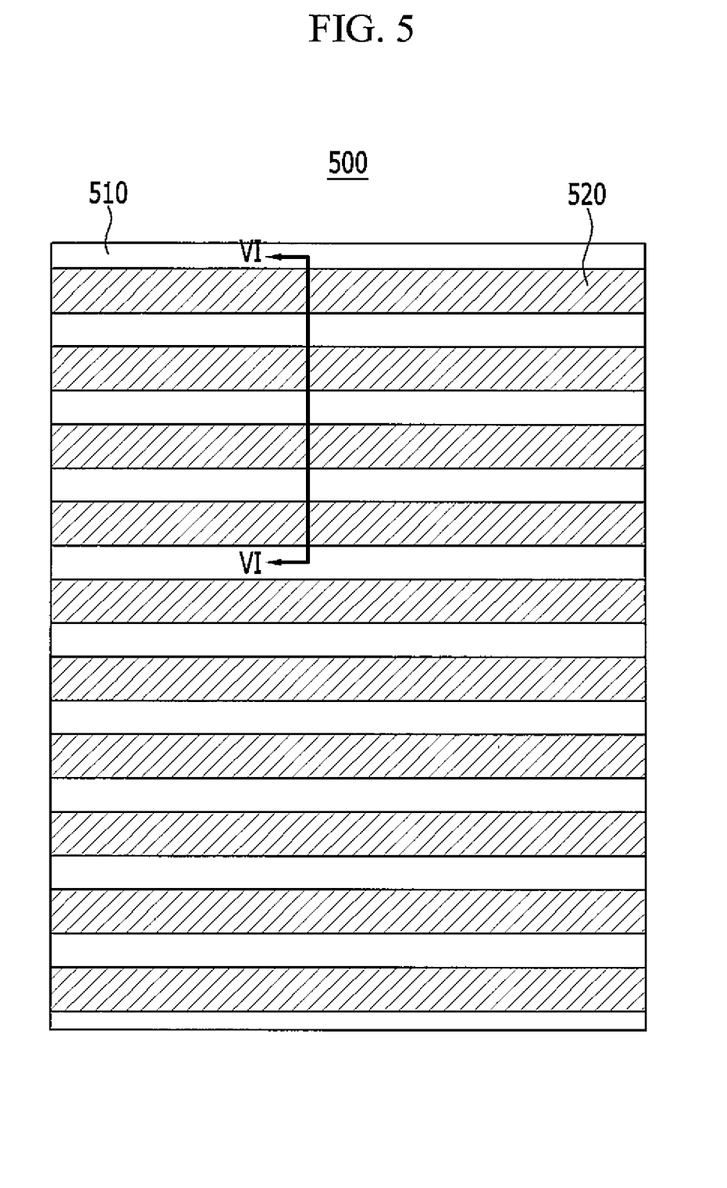
FIG. 5 is a schematic view of a plane surface of a window of a flexible display device according to another embodiment of the present invention.

FIG. 5 is a schematic view of a plane surface of a window of a flexible display device according to another embodiment of the present invention. FIG. 6 is a cross-sectional view taken along the line VI-VI of FIG. 5 showing a portion of the window of the flexible display device configured to receive an external touch.

Figure 6:
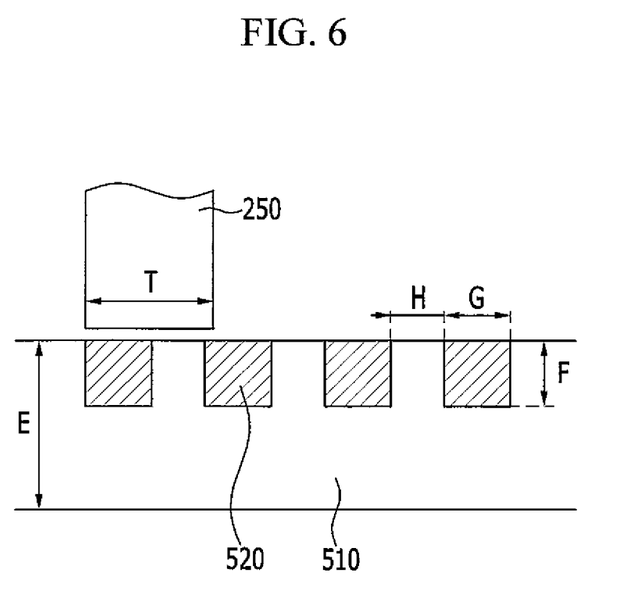
FIG. 6 is a cross-sectional view taken along the line VI-VI of FIG. 5 showing a portion of the window of the flexible display device configured to receive an external touch.

The window 500 shown in the embodiments illustrated in FIGS. 5 and 6, in another embodiment, may be applied to the flexible display device illustrated in FIG. 1.

Referring to FIGS. 5 and 6, the window 500 according to this embodiment includes an elastic portion 510 and a plurality of rigid portions 520 at the surface of the elastic portion 510 and separated from each other. The rigid portions 520, in an embodiment, may be positioned in a striped pattern at the surface of the elastic portion 510.

The elastic portion 510, according to an embodiment, is made of a soft material having elastic characteristics. For example, in an embodiment, the elastic portion 510 may be made of a material selected from an olefin-based elastomer, a urethane-based elastomer, and a polyester-based elastomer. In an embodiment, for example as illustrated in FIG. 5, the window 500 may include an elastic portion 510 made of a soft material, thereby having flexibility.

The rigid portions 520, according to an embodiment, may be made of a hard material. For example, the rigid portions 520, in an embodiment, may be made of a material selected from borides, carbides, aluminum nitride, silicon nitride, boron nitride, aluminum oxide, zirconium oxide, titanium oxide, and beryllium oxide. In an embodiment, for example as illustrated in FIG. 5, the window 500 may include rigid portions 520 made of a hard material, thereby providing sheet resistance characteristics against external forces.

In an embodiment, the rigid portions 520 may each have a thickness F extending into an inner portion of the elastic portion 510. In an embodiment, the thickness F of each rigid portion 520 may range from approximately 5% to approximately 50% of a thickness E of the window 500. In an embodiment where the thickness F of each rigid portion 520 is less than 5% of the thickness E of the window 500, it may be difficult for the window 500 to provide the necessary sheet resistance against external forces. In an embodiment where the thickness F of each rigid portion 520 exceeds 50% of the thickness E of the window 500, it may be difficult for the window 500 to have flexibility.

As described above, in an embodiment, the window 500 includes the elastic part 510 made of a soft material and the rigid portions 520 at the surface of the elastic portion 510 and made of a hard material, thereby providing flexibility and sheet resistance against external forces.

In an embodiment, a sum of a width G of one rigid portion 520 and an interval H between the rigid portions 520 is less than a maximum width T of a touched portion of the flexible display device generated by the touch of a user or of a touch pen 250. Thus, according to this embodiment, when the display device is touched by the user or a touch pen 250, the flexible portion 510 and a rigid portion 520 are simultaneously touched. Accordingly, in this embodiment, a restoration effect is generated by the elastic portion 510 made of the material having elastic characteristics after the touch of the user or the touch pen 250, such that the window 500 may exhibit mechanical flexibility at the locations where the touch of the user or the touch pen 250 occurred. In an embodiment, the touch may be generated through the finger or hand of the user, as well as the touch pen 250, and in these embodiments, the sum of the width G of one rigid portion 520 and the interval H between the rigid portions 520 may be less than the maximum width T of the touched portion.

In an embodiment, the sum of the width G of one rigid portion 520 and the interval H between the rigid portions 520 may be greater than or equal to a width of one pixel of the flexible display panel 100. Accordingly, the window 500 including the elastic portion 510 and the rigid portions 520, in this embodiment, may be prevented from affecting the resolution of the flexible display device. In this embodiment, one pixel may refer to one red pixel, one green pixel, and one blue pixel.

In these embodiments, the window 300 and 500 may include the elastic portion 310 and 510 and the rigid portions 320 and 520 at the surface of the elastic portion 310 and 510, however the window 300 and 500 is not limited thereto, and the window 300 and 500, according to other embodiments, may be made of only the soft material having elastic characteristics. In another embodiment, the window 300 and 500 may be a structure having a layer made of the hard material and a layer made of the soft material having elastic characteristics. In an embodiment, the window 300 and 500 may have a structure in which a layer made of the hard material is positioned between layers made of the soft material having elastic characteristics. Further, in other embodiments, the window 300 and 500 may have a structure in which a self-healing material is included in the soft material having elastic characteristics.

While embodiments of the present invention have been described in connection with what is considered to be practical embodiments, it is to be understood that the invention is not limited to the disclosed embodiments, but, on the contrary, is intended to cover various modifications and equivalent arrangements included within the spirit and scope of the invention and the appended claims.

| Description of the Reference Numerals | |
|---|---|
| 100: flexible display panel | 200: touch sensing layer |
| 300, 500: window | 310, 510: elastic portion |
| 320, 520: rigid portion | 400: barrier film |
| 250: touch pen | |

What is claimed is:

1. A flexible display device comprising:
a flexible display panel;
a touch sensing layer on the flexible display panel; and
a window on the touch sensing layer,
wherein the window comprises an elastic portion and a plurality of rigid portions at a surface of the elastic portion and separated from each other.

2. The flexible display device of claim 1, wherein each rigid portion has a thickness ranging from approximately 5% to approximately 50% of a thickness of the window.

3. The flexible display device of claim 2, wherein the elastic portion comprises a soft material having elastic characteristics.

4. The flexible display device of claim 3, wherein the soft material of the elastic portion comprises an olefin-based elastomer, a urethane-based elastomer, or a polyester-based elastomer.

5. The flexible display device of claim 4, wherein the rigid portion comprises a hard material.

6. The flexible display device of claim 5, wherein the hard material of the rigid portion comprises a boride, a carbide, aluminum nitride, silicon nitride, boron nitride, aluminum oxide, zirconium oxide, titanium oxide, or beryllium oxide.

7. The flexible display device of claim 6, wherein a sum of a width of one rigid portion and an interval between rigid portions is less than a maximum width of a portion of the flexible display device in contact with a touch pen configured to operate the flexible display device.

8. The flexible display device of claim 7, further comprising a plurality of pixels, wherein the sum of the width of one rigid portion and an interval between the rigid portions is greater than or equal to a width of one pixel.

9. The flexible display device of claim 1, wherein each rigid portion comprises a checkered pattern at the surface of the elastic portion.

10. The flexible display device of claim 1, wherein each rigid portion comprises a striped pattern at the surface of the elastic portion.

11. The flexible display device of claim 1, wherein the flexible display panel comprises a flexible substrate comprising polyethylene naphthalate (PEN), polycarbonate (PC), polyarylate (PAR), polyetherimide (PEI), polyethersulfone (PES), or polyimide (PI).

12. The flexible display device of claim 1, further comprising a barrier film at a surface of the flexible display panel.

* * * * *